No. 744,450. PATENTED NOV. 17, 1903.
F. M. WRIGHT.
CATTLE GUARD.
APPLICATION FILED MAR. 7, 1903.
NO MODEL.

WITNESSES INVENTOR
Fred M. Wright
BY
Attorneys

No. 744,450. Patented November 17, 1903.

UNITED STATES PATENT OFFICE.

FRED M. WRIGHT, OF CRESTVIEW, TENNESSEE, ASSIGNOR OF ONE-HALF TO WILLIAM R. KING, OF LAWRENCEBURG, TENNESSEE.

CATTLE-GUARD.

SPECIFICATION forming part of Letters Patent No. 744,450, dated November 17, 1903.

Application filed March 7, 1903. Serial No. 146,694. (No model.)

*To all whom it may concern:*

Be it known that I, FRED M. WRIGHT, a citizen of the United States, residing at Crestview, in the county of Lawrence and State of Tennessee, have invented certain new and useful Improvements in Cattle-Guards, of which the following is a full, clear, and exact description.

Figure 1:
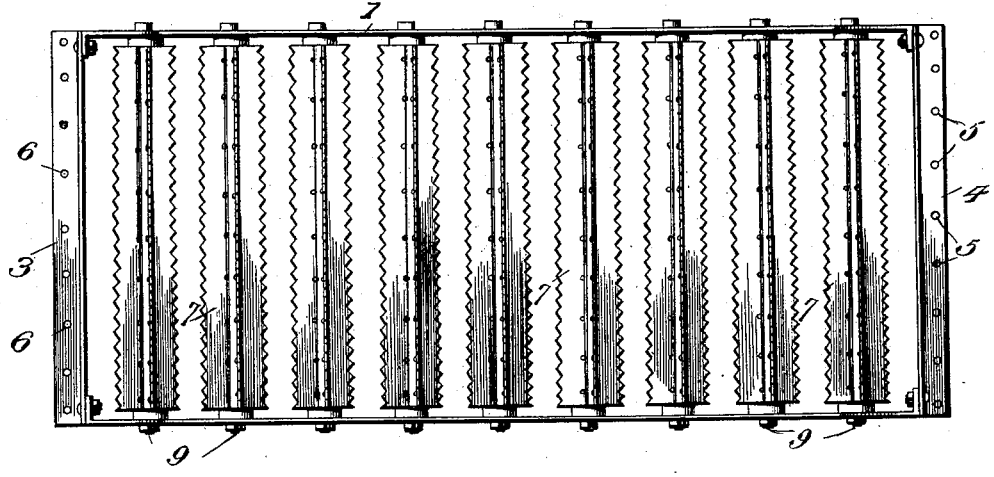
Figure 2:
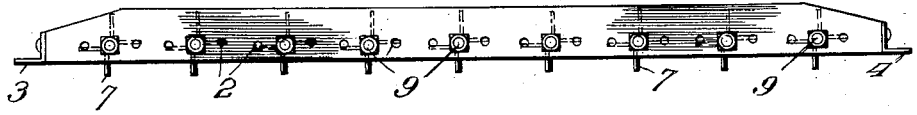
Figure 3:
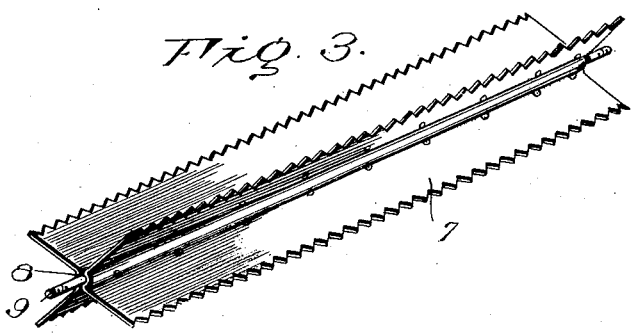

The object of my invention is to produce a cheap, simple, and effective cattle-guard, which consists of a rectangular frame adapted to be secured to cross-ties of the railroad-bed and revoluble members journaled in said frame.
In the drawings, Figure 1 is a top plan view of the cattle-guard embodying my invention. Fig. 2 is a side elevation of the same. Fig. 3 is a perspective view of one of the revoluble members detached.
1 represents the sides of the frame, each of which is provided with a series of journal-bearings 2, said sides being of any desired length.

3 and 4 are end pieces secured in a suitable manner to the side pieces 1, said end pieces being L-shaped in cross-section and provided with a series of bolt-openings 5 and 6, respectively, whereby said end sections are bolted to the cross-ties of the road-bed, as will be readily understood by those skilled in the art.

7 represents star-shaped or four-blade wheels of a length equal to the width of the frame and constructed of two substantially V-shaped members having a groove 7ª in the bottom, so that when the two members are brought together they form a bearing between them in which the rod 9 is secured, whereby the wheels are loosely journaled on said rods. The ends of the rods 9 are adjustably secured in place in the perforations 2 in the sides 1 of the frame, as will be clearly seen in the drawings. I have illustrated the frame as comprising nine of these wheels, but it is of course obvious that this number may be increased or diminished without affecting the advantages or scope of the invention.

The rods 9 for the purpose of adjustability are detachably secured in the perforations in the sides 1, so that a greater or less number of wheels may be placed in the frame of prescribed dimensions whereby the distance between the wheels may be regulated or adjusted according to the animal for which the guard is desired. For instance, the proposed distance of the centers of the wheels is five and one-half inches for cattle and horses and four and one-half inches for hogs and sheep. If found desirable, the wheels at one end may be adjusted for horses and cattle, while at the other end they may be adjusted for sheep and hogs.

The upper edges of the members 7 are serrated, as shown in the drawings.

The distinguishing feature of this invention is that when an animal steps on the guard its feet will pass through between the flange-wheels to the ground and by reason of the flanges on the adjacent wheels the animal may move backward and easily extricate itself, but cannot move or make any forward progress. In this connection it is pointed out that the frame is positioned between the rails about six inches above the ground.

The sides and end pieces of the guard will be so constructed that they can be bolted together, thus facilitating the shipping of these guards.

9ª represents washers of rubber or any suitable material interposed between the ends of the wheels 7 and the sides of the frame to prevent the parts from rattling.

What I desire to secure by Letters Patent is—

A wheel for cattle-guards comprising two V-shaped members, each having a groove formed in its bottom and extending throughout the length of the member to form a journal-bearing when the members are riveted together, the edges of the members being serrated.

The foregoing specification signed this 24th day of February, 1903.

FRED M. WRIGHT.

In presence of—
 D. W. STARNES,
 M. B. KINGS.